US006415386B1

(12) United States Patent
Shi et al.

(10) Patent No.: US 6,415,386 B1
(45) Date of Patent: Jul. 2, 2002

(54) CRYPTOGRAM LOCK SYSTEM WITH AUTOMATICALLY VARIABLE TRUE RANDOM CODE TONGLINGGE

(75) Inventors: Yi Shi, No.95 Tonglingge Rd., Xicheng District, Beijing (CN), 100031; Weizhi Tan, Beijing (CN)

(73) Assignee: Yi Shi, Beijing (CN)

(*) Notice: Subject to any disclaimer, the term of this patent is extended or adjusted under 35 U.S.C. 154(b) by 0 days.

(21) Appl. No.: 09/230,890

(22) PCT Filed: Jul. 10, 1996

(86) PCT No.: PCT/CN96/00051

§ 371 (c)(1), (2), (4) Date: Feb. 2, 1999

(87) PCT Pub. No.: WO97/04202

PCT Pub. Date: Feb. 6, 1997

(30) Foreign Application Priority Data

Jul. 21, 1995 (CN) ........................................ 95216380

(51) Int. Cl.[7] ........................... G06F 7/04; E05B 49/00

(52) U.S. Cl. .................. 713/200; 713/201; 340/825.31

(58) Field of Search ........................... 380/52; 713/200, 713/201, 170, 185; 340/382.5, 5.3, 5.67, 825.31

(56) References Cited

U.S. PATENT DOCUMENTS

| | | | | | |
|---|---|---|---|---|---|
| 3,906,447 | A | * | 9/1975 | Crafton | 235/382.5 |
| 4,213,118 | A | * | 7/1980 | Genest et al. | 235/382.5 |
| 5,140,317 | A | * | 8/1992 | Hyatt, Jr. et al. | 340/825.31 |
| 6,101,051 | A | * | 8/2000 | Sugita et al. | 360/2 |

* cited by examiner

*Primary Examiner*—Ly V. Hua

(74) *Attorney, Agent, or Firm*—Nath & Associates PLLC; Gary M. Nath; Marvin C. Berkowitz

(57) ABSTRACT

This invention provides an autonomous random dynamic cryptogram lock system which comprises a lock body and a key body. There are non-volatile memories in both the lock body and key body respectively and each memory stores a set of cryptogram corresponding. When unlocking the microprocessor in the lock body checks the cryptograms. If matching, the lock is unlocked, otherwise it gives up alarm. After unlocking, the microprocessor renews a set of the corresponding real random cryptogram in both memories for unlocking next time. It accomplishes one cryptoguard function every time.

5 Claims, 8 Drawing Sheets

( a ) Data arrangement in the memory of the lock body ( b) Data arrangement in the memory of the key body ( c ) Data arrangement in the memories of parent key/ black key

CRYPTOGRAM LOCK SYSTEM WITH AUTOMATICALLY VARIABLE TRUE RANDOM CODE TONGLINGGE

U.S. patent application Ser. No. 09/230,890 is an international application filed under 35 U.S.C. 371 with an international filing date of Jul. 10, 1996 (10.07.1996) as Ser. No. PCT/CN96/00051 claiming foreign priority under 35 U.S.C. 119 to China application no. CN 95216380.2 filed Jul. 21, 1995.

FIELD OF THE INVENTION

The present invention relates to a cryptogram lock system with an automatically variable true random code, and more particularly relates to the controller for said cryptogram lock system.

BACKGROUND OF THE INVENTION

There are three basic kinds of methods available for existing electronic cryptogram locks to produce their code and the like. One method is to input a code by user making use of a keyboard. According to this kind of method, a user has to remember the code. Thus, the security of the cryptogram lock is rather poor if a permanent code is used, several persons use a cryptogram lock, or a person uses several locks. Even if the code is changed as a security precaution, the user has to relearn a new code each time. In addition, this kind of cryptogram lock is not suitable for elderly people, children or person with lower educational lever because the operation for opening the lock is considered to be too complicated.

Another method is that a permanent code is selected by the user at the time of purchasing a cryptogram lock and the code is stored in the lock and corresponding keys. The code stored respectively in the lock and keys will be automatically compared when the cryptogram lock is opened. This kind of cryptogram lock prevents the user from the problem of having to remember the code, and therefore is widely applicable in the equipment including a magnetic card or an IC card. However, once the key is lost or reproduced by others without authority, the security of the cryptogram lock will be threatened seriously. In other hand, if the code needs to be revised in this kind of cryptogram lock, one must turn to specialist and special devices for help.

The third one is based on the second method to change the code by means of a certain algorithm. According to this method, the code of a cryptogram lock will be changed to a new one automatically or by the user through a specific operation (for example pushing a button) when the cryptogram lock is opened. The dynamic code obtained in this way is helpful for improving the security of the cryptogram lock. However, it is no longer a difficulty nowadays for a person to decipher the code by means of a computer because the code is produced depending on an algorithm.

It is understood, therefor, that the method for producing and managing a code has become the key point on whether electronic cryptogram locks can be popularized to replace the traditional lock and mechanical cryptogram lock.

SUMMARY OF THE INVENTION

The purpose of the present invention is to provide a cryptogram lock system with automatically variable true random codes to overcome the aforementioned disadvantages of the prior art. The cryptogram lock system of the present invention may be opened simply in the same manner as the conventional lock without the necessity for the user to input a code, therefore it relieves users from the burden for remembering the code. In addition, the code stored in the memory units of the lock-body as well as the key-body is not a permanent one, but one automatically changed every time after the lock is opened successfully. The code used in the cryptogram lock of the present invention is a true random code. That means there is no any mathematical relationship between the previous code and the new one, which excludes essentially the possibility of deciphering the code by means of a computer. The only possible way for deciphering the code is to make a thorough one-by-one try. As long as the code has enough length, however, the possibility of deciphering through such a try may be reduced to whatever low level as desired. For this reason, the cryptogram lock system according to the present invention may provide ideal safety.

The present invention is applicable for various cryptogram lock systems in form of either conventional lock or remote controlled one.

The cryptogram lock system with automatically variable true random code comprises a lock-body and a key-body with a bidirectional communication link established therebetween (either through connecting wire or radio set). The lock-body comprises a lock mechanism portion and a control portion, wherein said control portion comprises a microprocessor IC1, a non-volatile memory unit IC2, a true random code generator IC3, and an output driver IC5 for driving said lock mechanism portion, and an alarm unit IC6. Said key-body further comprises a non-volatile memory unit IC4.

The cryptogram lock system of the present invention operates in the following manner. At first, a code is stored respectively in the non-volatile memory units IC2 and IC4 of the lock-body and key-body. When a communication link is established between the lock-body and the key-body, the microprocessor IC1 within the lock-body takes out the code stored in the memory unit IC4 of the key-body and compares it with the code stored in the unit IC2 of the lock-body. If the two codes are coincident with each other, the microprocessor controls the driving mechanism to open the lock, otherwise the microprocessor activates the alarm unit to send out an alarm signal. Whenever the cryptogram lock is opened successfully, the microprocessor IC1 takes out immediately a new code from the true random code generator to replace the previous one stored in the memory units IC2 and IC4 so as to make the lock system ready for the next operation. In such a manner, the code used by the lock system can be updated in each opening operation.

In conclusion, the cryptogram lock system of the present invention is characterized in that the code is neither inputted through a keyboard nor stored permanently in the lock system, but generated by a true random code generator. Whenever the cryptogram lock is opened successfully, the microprocessor takes out a new code from the true random code generator to replace the previous one stored in the memory units of the lock-body and key-body, respectively.

BRIEF DESCRIPTION OF THE DRAWINGS

The invention will be described hereinafter with reference to the accompanying drawings, wherein.

DETAIL DESCRIPTION OF A PREFERRED EMBODIMENT

Figure 1:
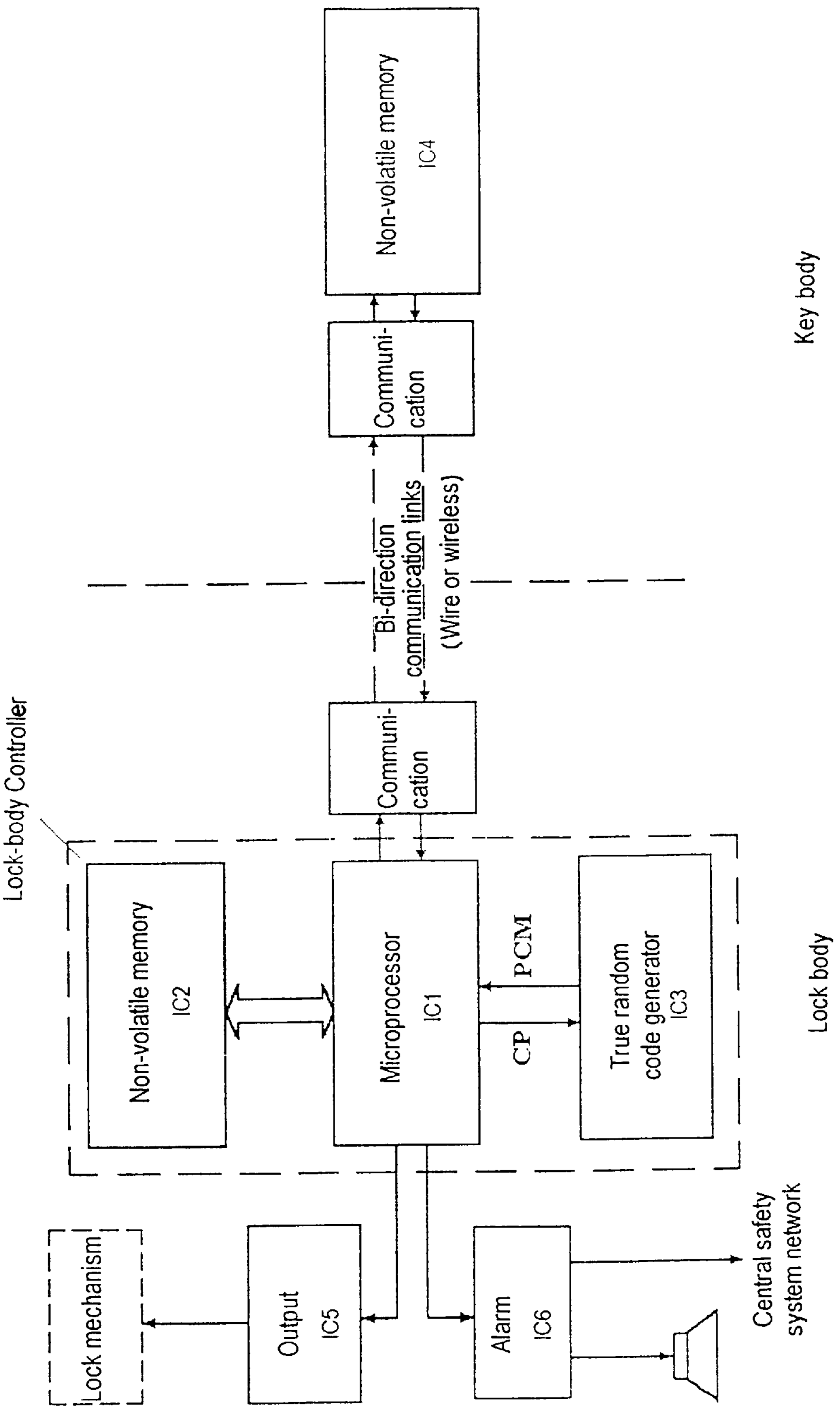
FIG. 1 is a block diagram showing the function of the lock-body and key-body of the cryptogram lock system of the present invention.

Referring to FIG. 1, the cryptogram lock system with automatically variable true random code according to the present invention comprises a lock-body and a key-body with a bi-directional communication link established therebetween. Said communication link may be in the form of either wire or radio. The lock-body consists of a lock mechanism portion and a control portion. The control portion in the lock-body comprises a microprocessor IC1, a nonvolatile memory unit IC2 and a true random code generator IC3. Said control portion controls the lock mechanism portion through an output driver IC5. The control portion also controls an alarm unit IC6. In addition, the key-body of the cryptogram lock system according to the present invention also has a non-volatile memory unit IC4.

The code used in the cryptogram lock system of the present invention is neither inputted through a keyboard nor generated by any algorithm, but produced by a true random code generator set in the lock-body. Whenever the lock is opened successfully, the microprocessor IC1 takes out automatically a new code from the true random code generator and stored it simultaneously in the memory units IC2 and IC4, respectively, for the next opening operation.

The term “true random code” is distinguished from pseudo-random code in that, although the latter is of stochastic feature in some extent, it follows more or less a certain intrinsic rule for generation. Once the rule is revealed, it is possible to predetermine the next code from the previous one. In this sense, the cryptogram lock making use of pseudo-random number is not absolutely safe.

In contrast, the true random code is a series of numbers with a completely stochastic feature. The traditional method for generating a true random code is to select a kind of noise producing an element such as an avalanche diode. A circuit is designed to amplify and gating the noise produced by the element so as to obtain a sequence of pulses with random widths. A series of random numbers can be obtained by sampling said sequence of the pulses with an independent clock pulse of low frequency. Since the pulse widths of said sequence of the pulses depend on the noise of the avalanche effect and various parameters of the circuit (e.g. amplifying gain, threshold value, working point, etc.), some special technical measures, such as temperature compensation, temperature control or designing a circuit with stable working point, have to be adopted in order to obtain a random number series with ideal stochastic feature. This will result in a relatively complicated and large device unsuitable for forming a single integrate chip arranged in a lock-body.

Compared with the traditional amplifying—limiting—sampling method, the solution adopted by the present invention for generating the true random code is characterized by using an oscillator of random oscillating frequency and sampling the output of said oscillator by a independent clock pulse series of low frequency.

Figure 3:
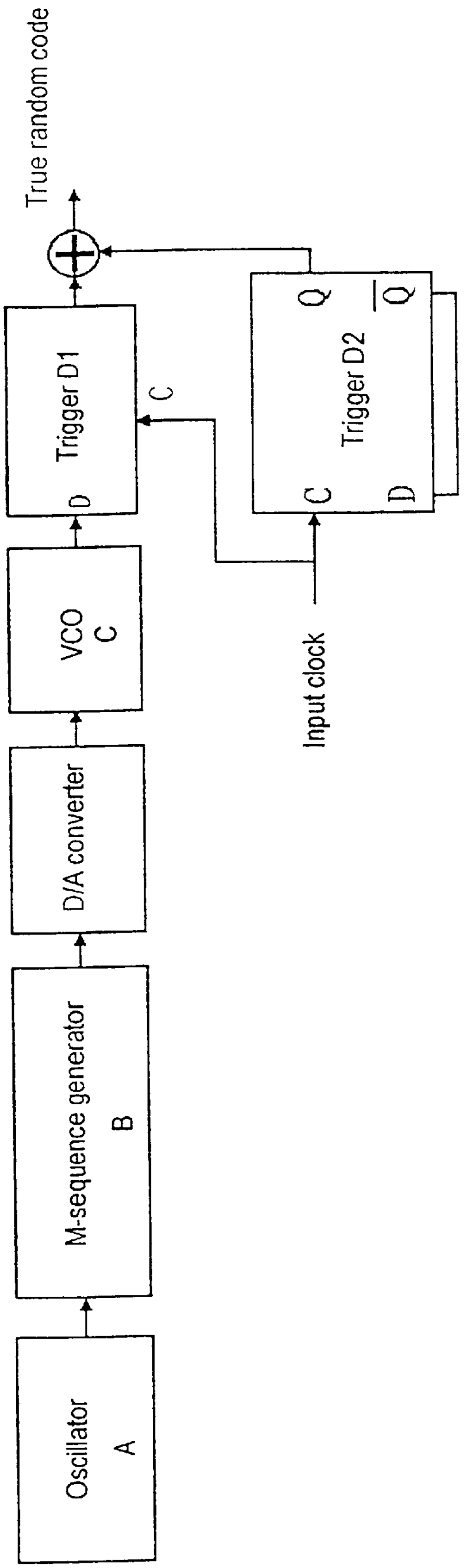
FIG. 3 is a block diagram showing the principle of generating the true random code used in the cryptogram lock system.

FIG. 3 shows the principle for generating true random number according to the present invention. Referring to FIG.

3, an independent oscillator A is adopted to drive a pseudo-random code (m-sequence) generator B. The output of B is converted by a D/A converter into the levels varying with a pseudo-random rule. Said levels are used to control a voltage-controlled oscillator (VCO) so as to obtain a spectrum-spreaded signal. The frequency of said oscillator A should be lower than one fifth of the central frequency of VCO. The output signal from the VCO is then sampled by another independent pulse series of low frequency (lower than one tenth of the lowest frequency of VCO) so as to obtain a desired true random code. In order to make 0–1 distributed more evenly in the random numbers, the sampled output of VCO is further exclusive-ORed, bit by bit, with a sequence of alternating 1 and 0, and the said alternating sequence is produced by a D trigger-divider.

It is necessary to point out that the low frequency clock for carrying out the last sampling operation is a pulse series outputted by the microprocessor ICI when it takes out a new code. The clock with low frequency is not only frequency-independent on the oscillating source, but also completely random in the time point of taking out the code.

According to the aforementioned principle, the circuits for generating true random numbers are suitable for forming a single integrate chip applicable for various small devices.

Figure 2:
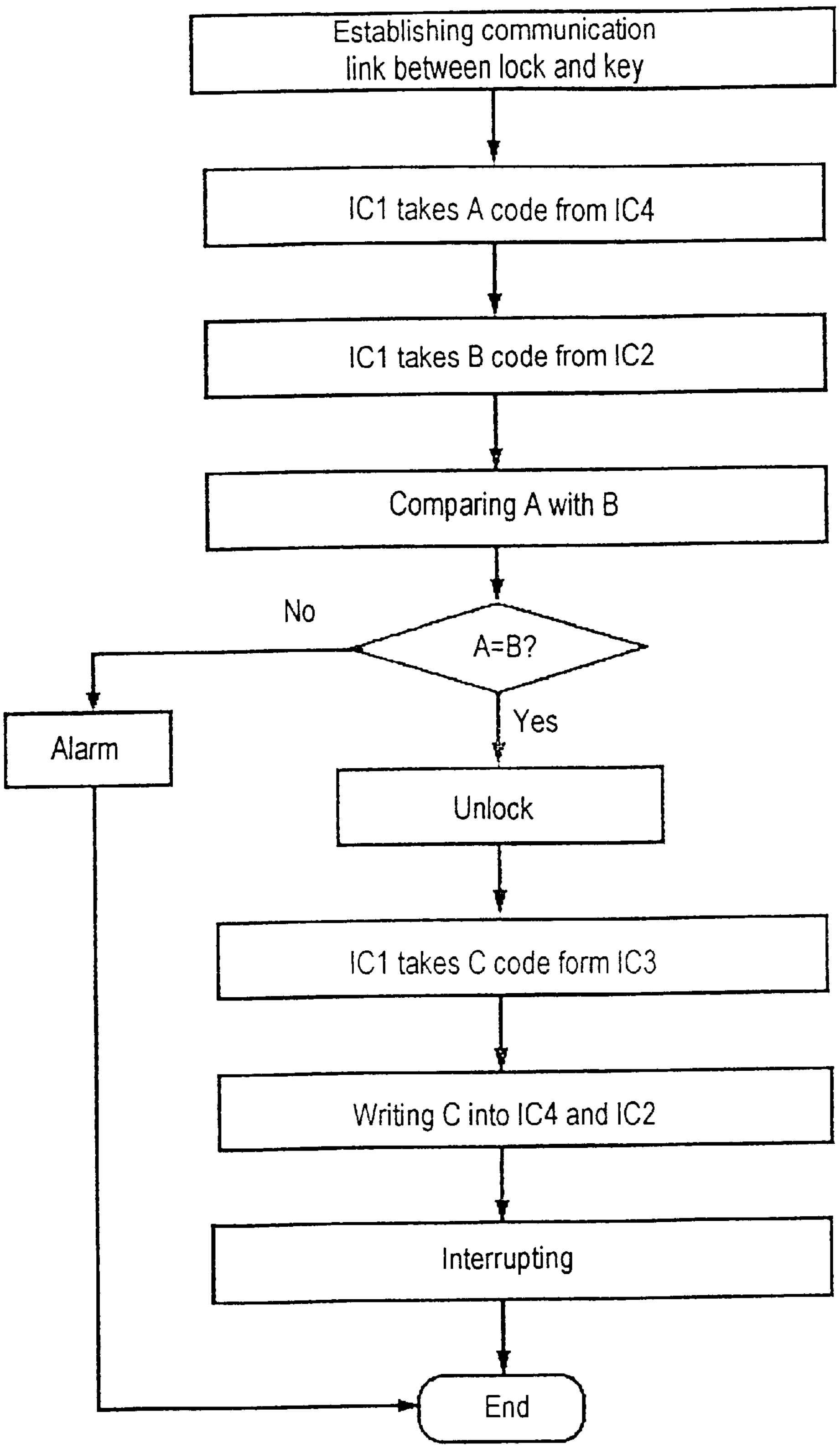
FIG. 2 is a flow chart showing the operation of the cryptogram lock system.

The operation of the cryptogram lock system of the present invention will be described with reference to FIG. 2. At first, a communication link is established between the lock-body and the key-body. At this time, the microprocessor IC1 takes code A and code B respectively from the memory unit IC2 within the lock-body and memory unit IC4 within the key and compares them with each other. If said two codes are coincident with each other, the microprocessor IC1 controls the driver IC5 to open the lock, then takes a new code from the true random code generator IC3 and stores it respectively in units IC2 and IC4. If the code A and B are not coincident, IC1 controls the alarm unit to send out an alarm signal. In this manner, it is possible to realize the management of random codes in a system consisting of one lock with multiple keys or multiple locks with one key. More particularly, codes are stored in different locations of the two memory units according to the series number of key and lock. For different keys of the same lock or different locks with the same key, the codes are not only different and random, but also independent from each other. When opening a lock, the codes are searched and checked according to the series number of the lock and key. According to this solution, only one key is necessary for a user to open locks that he is authorized to opened. This deletes not only the necessity for one to carry a lot of keys, but also provides conveniences for optionally arranging the authority of opening locks. For example, a waiter of a hotel may use one key to open the door of each room maintained by him, but is incapable of opening other locks in a room. A guest may use one key to open all of the locks in his own room, but may not open door of another room.

Figure 4:
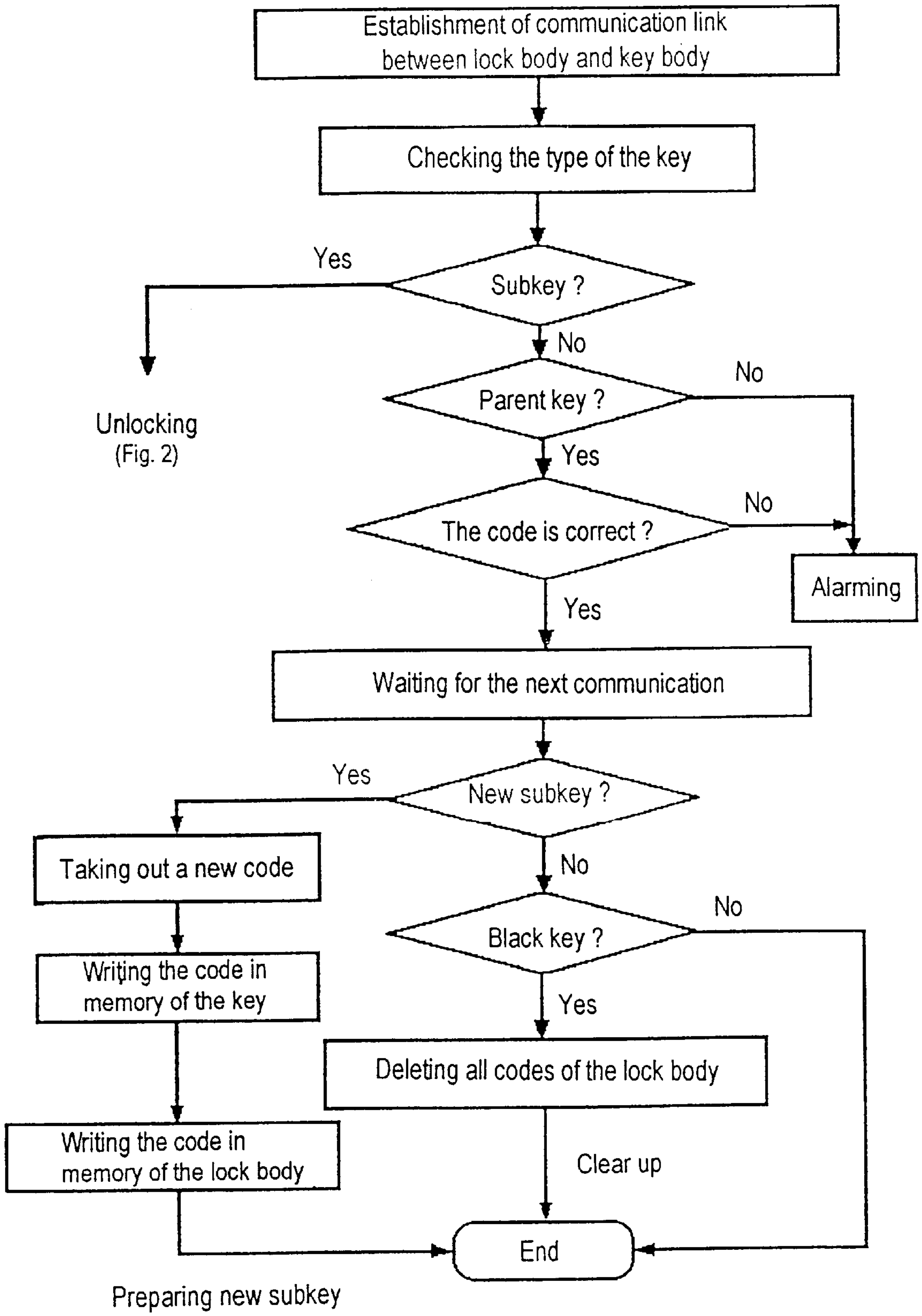
FIG. 4 is a flowing chart showing the procedure of preparing a new subkey of the cryptogram lock system.

Another important feature of the cryptogram lock system according to the present invention is to provide three different kinds of key-bodies. The key-body may be a parent key, a subkey and/or a black key, which have different functions and are distinguished from each other by their function codes. The called “subkey” is the key for opening a cryptogram lock. There may be multiple subkeys prepared for one cryptogram lock. The called “parent key” is specifically designed for preparing subkeys under authorization. The black key is used specifically for canceling the authorization of any subkeys. When purchasing a cryptogram lock of the present invention, the customer can select rationally a user code and store it into the memory unit of the parent key, black key and the lock-body. Whenever a new subkey is needed to be prepared, the user should firstly establish a communication link between the parent key and lock-body, and check the user code. If the result is correct, a random code will be stored simultaneously into the memory unit of a subkey and the lock-body by the microprocessor within a lock-body through the communication link established between the subkey and lock-body, which makes the subkey authorized. When it is necessary to cancel the authorization of a subkey, a communication link should be established at first between the black key and lock-body to check the user code. If the result is correct, the random code corresponding to the particular subkey will be erased by the microprocessor through the communication link between the lock-body and subkey, which makes the subkey unauthorized. If it is necessary to cancel all of the previously authorized subkeys, such as in case one of subkey is lost, the user can establish at first the communication link between the parent key and lock-body to check his user code, then set the communication between the black key and lock-body to check the user code again, and finally delete all of the random codes stored in the memory unit by the microprocessor. After the accomplishment of "clear up", a number of new subkeys may be reproduced simply by following the procedure aforementioned for preparing a new subkey. Those operations are shown in FIG. 4.

Since all of those operations are as simple as the operation for opening the cryptogram lock without the necessity of utilizing any specific equipment and special technique, it is quite easy to be performed by users.

When selecting the user code during the time of purchasing, the microprocessor will automatically divide the code into two segments A and B and store both of them into the memory unit of the lock-body, wherein the segment A is used as the address point of the segment B. In the memory unit of the parent key and black key, segment B is stored only in the address indicated by segment A, and the remainder portion of the memory unit is filled with useless code. For this reason, the user code cannot be known by others even if the parent key or black key is lost. In addition, it is also impossible for the manufacturer or salesman to know the user code of the sold cryptogram lock. In normal times, the parent key and black key will not be used and therefore should be kept appropriately. In case the parent key or black key is lost, the user may take out the user code recorded secretly by him and go to any service station to reproduce a parent key or black key without the necessity of bringing the lock-body together with him.

In addition, the microprocessor within the lock-body may not only be connected with the output driver to control the opening of the lock, but also has alarming input and output ports. Said input port is designed for receiving various alarm signals produced from outside sources, such as signal of illegal opening door, smoke alarming signal, etc. The output port is for sending out various signals concerning the opening of the cryptogram lock, such as the series number of lock, the series number of the key which is used right now to open the lock, alarming signal, etc. Those signals may be sent to a monitoring center through a network to form a centralized safety system.

A practical example will be described hereinafter to explain the present invention in more detail. It is understood that the example is only to demonstrate the invention rather than limit the scope of the invention.

EXAMPLE

Figure 5:
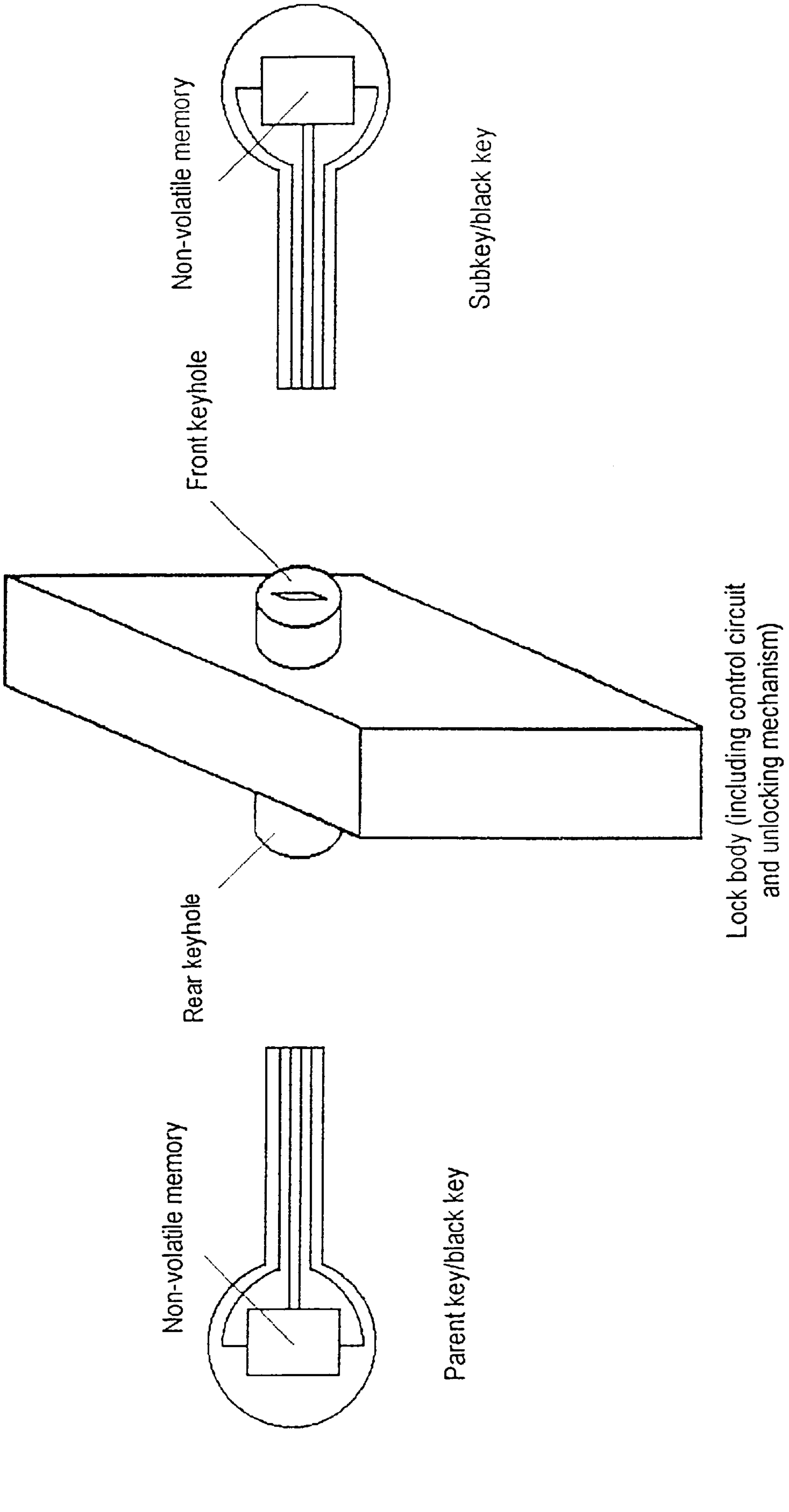
FIG. 5 shows the structure according to the embodiment of the cryptogram lock system.

As shown in FIG. 5, the cryptogram lock of this example can be operated in an ordinary way by inserting a key into the lock. The communication between the lock-body and key-body is established through conducting wires. There are two key-holes designed respectively on the opposing sides of the lock-body. Contact points or holes are formed respectively within the key-holes as well as on the remote end of the key. When the lock is opened, a subkey should be inserted into the front key-hole. When a new subkey is prepared, a user should insert the parent key into the rear key-hole and the subkey to be prepared into the front key-hole. When canceling a subkey, the user should insert the black key into the rear key-hole and the subkey to be canceled into the front key-hole. In case all of the subkeys need to be canceled, one should insert the parent key into the rear key-hole and the black key into the front key-hole.

Figure 6:
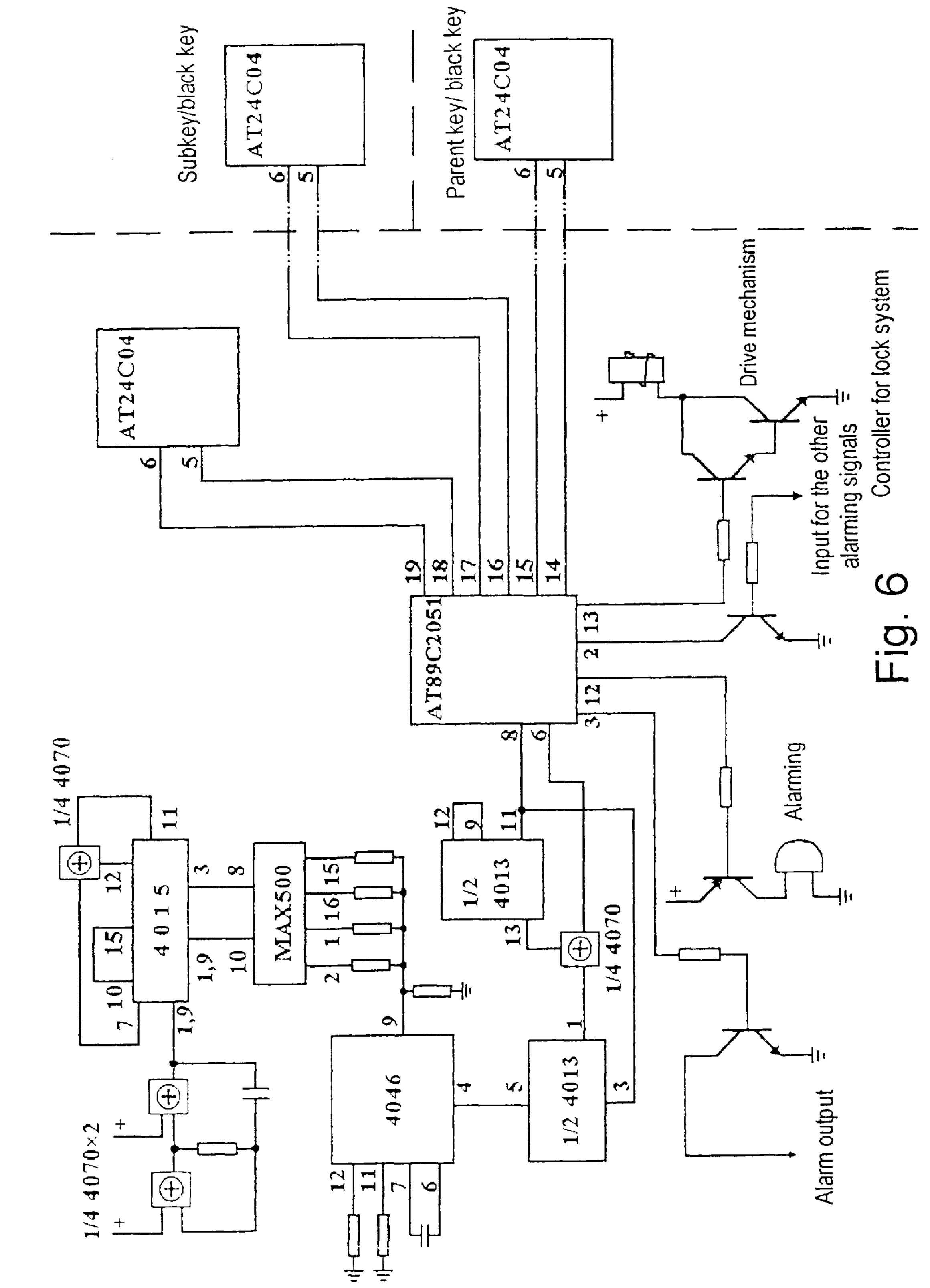
FIG. 6 shows the circuit according to the embodiment of the control portion of the cryptogram lock system.

The circuit adopted by this example is shown in FIG. 6. In this circuit, the microprocessor is formed by AT89C2051, the memory unit of key and lock-body is AT24C04, the true random code generator consists of five integrate chips, namely 4015, MAX500, 4070, 4067 and 4013.

The P1.6 (pin 18) of the microprocessor is connected respectively with the data wire SDA (pin 5) and clock pulse wire SCL (pin 6) of the memory unit of the lock-body for reading and writing the code. When the subkey/black key is inserted into the front key-hole, the P1.4 (pin 16) and P1.5 (pin 17) of the microprocessor are connected respectively with the data wire SDA (pin 5) and clock pulse wire SCL (pin 6) of the memory unit of the subkey/black key for reading and writing the code. When the parent key is inserted into the rear keyhole, the P1.2 (pin 14) and P1.3 (pin 15) of the microprocessor are connected respectively with the data wire SDA (pin 5) and clock pulse wire SCL (pin 6) of the memory unit of the parent key for reading and writing the code. When the code is verified, a controlling signal will be sent out from the P1.3 (pin 13) of the microprocessor for driving the lock opening mechanism and then close it after predetermined time. The P1.0 (pin 12) is used to send a alarm signal when the verified result is false. The RXD (pin 2) of the microprocessor is used for receiving external alarm signals, its TXD (pin 3) is for output alarm signal (such as the series number of lock or key). The true random code generator of this embodiment has, in comparison with that shown in FIG. 3, a oscillator A consisting of two exclusive-OR gates, a m-sequence generator consisting of a 7 bit shift-register (with $X^7+X^6$ feedback), a D/A converter consisting of MAX500, VCO making use of the local oscillation of the phase locked-loop 4046, and two D triggers consisting of 4013. The clock pulse for taking out random code is outputted from the pin 8 ($T_0$)of the microprocessor, and the random code is inputted into the microprocessor through pin 6 (INTO).

While the present invention has been particularly described with reference to the aforementioned preferred embodiment, it would be understood by those skilled in the art that various changes in form and detail may be made within the scope of the invention. Since the I/O arrangement of a microprocessor is rather flexible, it is possible to adjust the arrangement according to the necessity and habit of designer. The various integrated elements used in the aforementioned embodiment may also be replaced by other elements with the similar function. In addition, it is worth pointing out that some well-known elements as well as their connection are omitted from FIG. 6 for simplicity, which can be checked easily with reference to handbooks in the art.

Figure 7A:
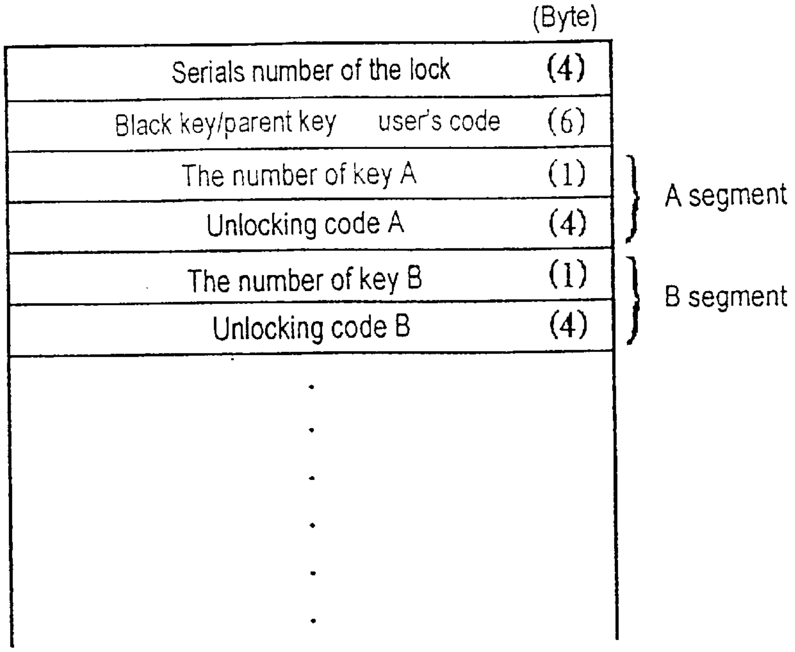
FIGS. 7(*a*), (*b*) and (*c*) show one example of the arrangement of the lock-body and the key-body.
Figure 7B:
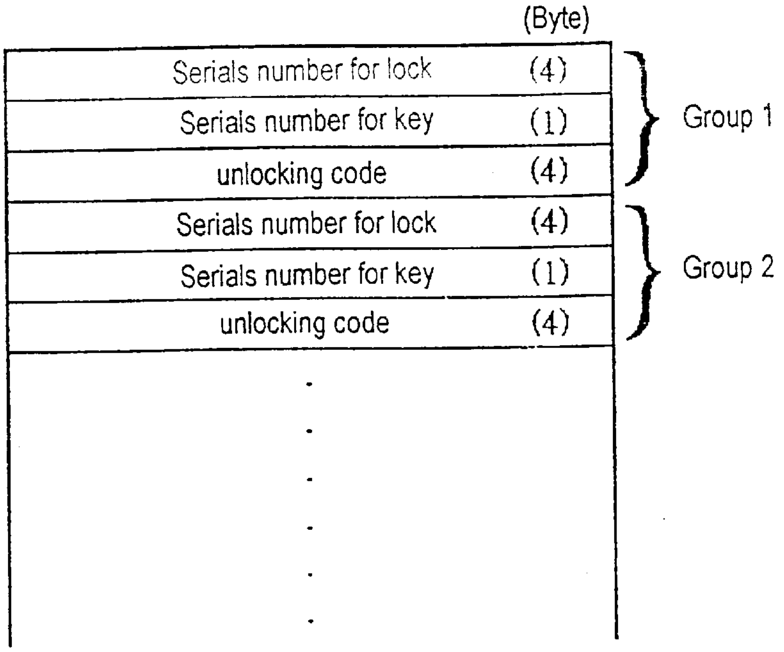
Figure 7C:
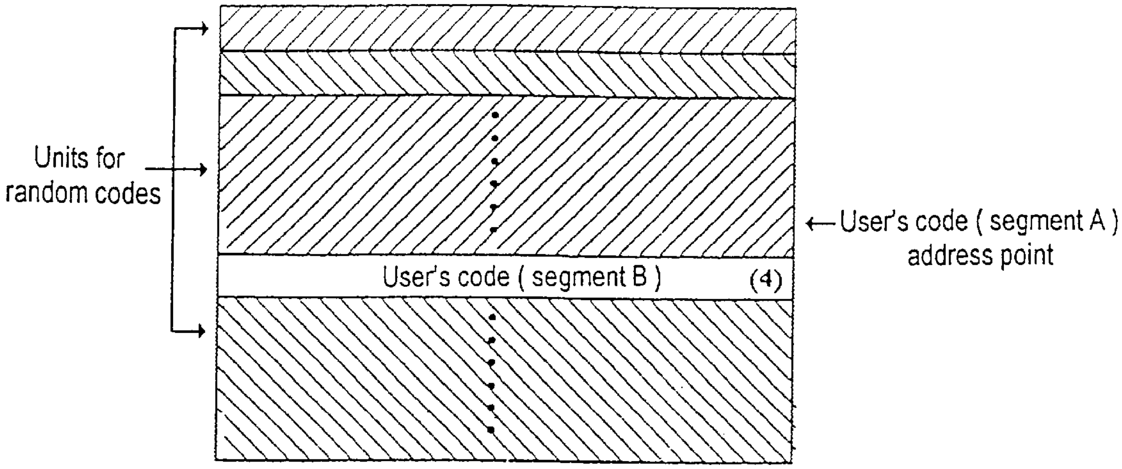

The length of the user code used in the aforementioned embodiment is 6 bytes (2 bytes for segment A and 4 bytes for segment B). The random code for opening the lock is 3 bits. The sequence number of the lock is 2 bytes, and the sequence number of the key is 1 bytes. FIG. 7 shows one example of the arrangement of the lock-body and the key-body, however, it is not the only possible way for realizing the invention.

What I claim is:

1. A cryptogram lock system comprising:

a lock-body and a key-body with a bidirectional communication link established therebetween, wherein:

said lock-body comprises a lock mechanism portion and a lock control portion; and said key-body comprises a non-volatile memory unit IC4;

wherein said control portion comprises a microprocessor IC1, a non-volatile memory unit IC2 and a true random code generator IC3 and the microprocessor IC1 takes out a new random code from the true random code generator IC3 to update a code previously stored in the IC2 and IC4 when the lock system is opened each time; and said lock control portion controls the operation of the lock mechanism portion through an output driver IC5 set in the lock-body.

2. The cryptogram lock system according to claim 1, wherein the key-body comprises a subkey to open the lock-body for users.

3. The cryptogram lock system according to claim 1, wherein the key-body comprises a parent key to prepare new subkeys under authorization.

4. The cryptogram lock system according to claim 1, wherein the key-body comprises a black key to cancel the authorization of a subkey or all subkeys.

5. The cryptogram lock system according to claim 1, wherein said true random processor IC3 comprises an oscillator, an m-sequence generator, a D/A converter, a voltage-controlled oscillator, and a low frequency pulse generator, wherein said oscillator is used to drive said m-sequence generator to generate a sequence code, said D/A converter converts the sequence code into level varying according to a pseudo-random rule, said voltage-controlled oscillator produces a varying spread-spectrum signal under the control of said level, and said low frequency pulse generator samples the spread-spectrum signal to produce said true random code.

* * * * *